United States Patent
Dakshinamurthy et al.

(10) Patent No.: US 8,437,697 B2
(45) Date of Patent: *May 7, 2013

(54) PROCESSING OF MULTI-CARRIER SIGNALS BEFORE POWER AMPLIFIER AMPLIFICATION

(75) Inventors: Sriraman Dakshinamurthy, San Jose, CA (US); Robert G. Lorenz, Menlo Park, CA (US); Ming Hu, Santa Clara, CA (US); Derek K. Shaeffer, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,813

(22) Filed: Aug. 23, 2012

(65) Prior Publication Data

US 2012/0314804 A1     Dec. 13, 2012

Related U.S. Application Data

(63) Continuation of application No. 12/719,169, filed on Mar. 8, 2010, now Pat. No. 8,275,319.

(60) Provisional application No. 61/209,902, filed on Mar. 11, 2009.

(51) Int. Cl.
    *H04B 1/02*     (2006.01)
(52) U.S. Cl.
    USPC .......................................................... 455/45

(58) Field of Classification Search ..................... 455/44, 455/45, 63.1, 67.11, 550.1, 561, 102, 103, 455/115.1, 226.1; 375/260, 261, 295
    See application file for complete search history.

(56) References Cited

U.S. PATENT DOCUMENTS

| | | |
|---|---|---|
| 7,395,034 B2 | 7/2008 | Teramoto |
| 7,792,201 B2 * | 9/2010 | Lee et al. ..................... 375/260 |
| 2003/0092403 A1 | 5/2003 | Shapira et al. |
| 2006/0172713 A1 | 8/2006 | Suzuki et al. |
| 2008/0137767 A1 | 6/2008 | Jaenecke |
| 2009/0180560 A1 | 7/2009 | Yamasuge |
| 2009/0207936 A1 | 8/2009 | Behzad |
| 2009/0323857 A1 | 12/2009 | Singh et al. |
| 2010/0027690 A1 | 2/2010 | Liang et al. |
| 2010/0232413 A1 | 9/2010 | Dakshinamurthy et al. |

* cited by examiner

*Primary Examiner* — Thanh Le
(74) *Attorney, Agent, or Firm* — Sterne, Kessler, Goldstein & Fox P.L.L.C.

(57) ABSTRACT

Embodiments for methods and apparatuses for processing a multi-carrier signal are disclosed. One method includes shaping a frequency spectrum of a multi-carrier transmit signal wherein an amplitude of a plurality of subcarriers of the multi-carrier transmit signal is increased relative to at least one other subcarrier of the multi-carrier transmit signal. The shaped frequency spectrum multi-carrier transmit signal is amplified with a power amplifier, wherein a power level of an output of the power amplifier is greater than a rated power level of the power amplifier.

21 Claims, 13 Drawing Sheets

PROCESSING OF MULTI-CARRIER SIGNALS BEFORE POWER AMPLIFIER AMPLIFICATION

RELATED APPLICATIONS

This patent application is a continuation of U.S. patent application Ser. No. 12/719,169, filed on Mar. 8, 2010, now U.S. Pat. No. 8,275,319, which claims priority to U.S. provisional patent application Ser. No. 61/209,902, filed on Mar. 11, 2009, each of which is incorporated by reference in its entirety.

FIELD OF THE DESCRIBED EMBODIMENTS

The described embodiments relate generally to wireless communications. More particularly, the described embodiments relate to preprocessing of multicarrier signals before amplification by a power amplifier.

BACKGROUND

Conventional wireless systems employ radio-frequency (RF) transmitters to produce an output signal that can be applied to an antenna for communication between stations separated by some distance. In mobile wireless networks, one station may be a subscriber station (SS), whereas another station may be a base station (BS). As the SS roams throughout the coverage area of the wireless network, the path loss between the SS and the BS changes due to a number of factors including the change in distance between the stations as well as the presence of objects in the environment that serve to obstruct or attenuate the signals traveling from one station to the other. To ensure proper network operation, the BS will instruct the SS to increase or decrease its transmit power as required to overcome the path loss between the SS and BS so that the BS will continue to receive the MS signals as channel conditions change. Over the full range of possible transmit powers, the SS must maintain a certain signal quality so as not to inhibit detection of its transmit signals by the BS. Depending upon the details of the physical environment between the SS and BS, at some critical distance from the BS the SS will no longer be able to increase its output power while maintaining the required signal quality. At that point, communication between the SS and BS can no longer be maintained and the link will be dropped unless the BS is able to hand-off communication with the SS to a neighboring BS. Therefore, the maximum output power capability of the SS is: a critical parameter that ultimately determines the expected distance over which the SS and BS can communicate and thereby the number and spacing of BS sites that is required to provide reliable coverage in a mobile network. However, the greater the number of BS sites, the greater the cost to implement the mobile network.

Accordingly, there is a need to maximize the output power capability of the MS to ensure reliable coverage with a minimum of required BS sites. The coverage is usually limited by the MS as the BS transmitter typically has sufficient output power to provide reliable coverage over an acceptable cell area.

It is instructive to consider the factors limiting the maximum transmitter output power in a conventional RF transmitter. Among those factors are the error vector magnitude (EVM) and the spectral emissions mask. The EVM characterizes the fidelity of the actual transmit signal with respect to the intended transmit signal. This is commonly visualized as illustrated in FIG. 1 in which the complex transmitted signal comprising in-phase (I) and quadrature (Q) components at certain critical instants in time is compared to a regular constellation of points representing the ideal values of the transmitted signal at those same instants. The constellation of points that are used in transmission is referred to as the modulation. The EVM is given by the root-mean-square (RMS) distance between the actual signal and the corresponding ideal constellation points normalized to the average radius over all of the constellation points. Forward error correction codes are commonly used in wireless transmission. Taking together, the modulation and the coding schemes are referred to as the Modulation and Coding Scheme (MCS). Different Modulation and Coding Schemes have different EVM requirements. A greater EVM can be tolerated for a 'loosely packed' constellation corresponding than it can for a 'densely packed' constellation corresponding for the same coding rate. In many systems, the transmitter may be able to operate using a variety of MCS levels. Doing so allows for the transmission data rate to be adapted as conditions allow. For example, when the MS is closer to the BS, the BS will generally be able to detect a higher MCS level thereby allowing for an increased data rate for data transmitted from MS to BS. Similarly, when the MS is farther from the BS, the BS may need to reduce the MCS level to ensure reliable reception. Thus, having some flexibility to control the MCS level is advantageous in that it provides the ability to operate at the maximum data rate that can be accommodated by the link conditions. The transmitter EVM is degraded by noise and intermodulation distortion products produced by the transmitter as it amplifies the transmit signal.

A second factor limiting the maximum transmitter output power is the spectral emissions mask, which characterizes the amount of spurious emissions generated by the transmitter that fall into neighboring channels. As illustrated in FIG. 2, there is a limit on the acceptable level of such emissions to avoid interference with neighboring transmitters. These emissions are caused primarily by inter modulation distortion of the, transmit signal occurring due to nonlinear amplification by the transmitter. Hence, both EVM and spectral emissions mask performance are determined by noise and nonlinearity in the RF transmitter.

A critical component in a conventional transmitter that produces such distortion is a power amplifier. A power amplifier will typically possess a maximum output power rating. Operating the power amplifier at output powers exceeding this rating may result in unacceptable EVM or spectral mask performance. As an RF transmitter may be asked to produce the maximum output power for any MCS level, it is generally necessary for the transmitter to comply with the most restrictive EVM requirement corresponding to the highest MCS level while also meeting the spectral emissions mask.

However, when the MS is positioned near the outer boundary of a given BS cell, the RF transmitter may be operating at a lower MCS level because a lower MCS level is more tolerant of attenuation along the path between MS and BS and therefore is easier to detect and demodulate. Under such operating conditions, one can infer based on the foregoing discussion that the maximum output power of the transmitter is primarily dictated by the spectral emissions mask requirement rather than the EVM requirement since the latter enjoys a relaxation for low MCS levels. However, a relaxed EVM requirement alone is not enough to permit operation of the transmitter at an increased output power because the transmitter must satisfy the tighter specification imposed by the spectral emissions mask requirement which is typically independent of MCS level.

It is desirable to have a technique that allows for increased output power at low MCS levels at the expense of EVM performance while maintaining a specified spectral emissions mask performance. Doing so would enable a beneficial increase in transmitter output power when the MS operates near its maximum range from the BS, thereby improving the reliability of the network and reducing the required number and spacing of base stations. An object of the present invention is to provide this capability.

SUMMARY

An embodiment includes a method of processing a multi-carrier signal. A first step of the method includes shaping a frequency spectrum of a multi-carrier transmit signal wherein an amplitude of a plurality of subcarriers of the multi-carrier transmit signal is increased relative to at least one other subcarrier of the multi-carrier transmit signal. A second step of the method includes amplifying the shaped frequency spectrum multi-carrier transmit signal with a power amplifier, wherein a power level of an output of the power amplifier is greater than a rated power level of the power amplifier.

Another embodiment includes another method of processing a multi-carrier signal. The method includes amplitude compressing a time-domain version of the multi-carrier transmit signal and filtering the compressed multi-carrier transmit signal. The compressed multi-carrier transmit signal is amplified with a power amplifier, wherein a power level of an output multi-carrier signal of the power amplifier is greater than a rated power level of the power amplifier.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses for increasing the output power of an OFDM (Orthogonal Frequency Division Multiplexing) RF (Radio Frequency) transmitter. OFDM transmitter processing of the transmit signal can be include several steps that may be applied. individually or in combination to allow for increased output power at the expense of EVM performance while maintaining spectral emissions mask performance. For an embodiment, the processing steps include a frequency shaping step that tailors the frequency response of the signal. For an embodiment, the transmit signal is compressed by a memory-less nonlinearity to produce a compressed signal. The compressed signal is filtered to produce a filtered compressed This signal is then coupled to an RF power amplifier. For another embodiment, the processing steps include a frequency shaping step that tailors the frequency response of the signal followed by compression by a memoryless-nonlinearity. The compressed shaped signal is filtered to produce a filtered compressed shaped signal. This signal is then coupled to an RF power amplifier.

Figure 1:
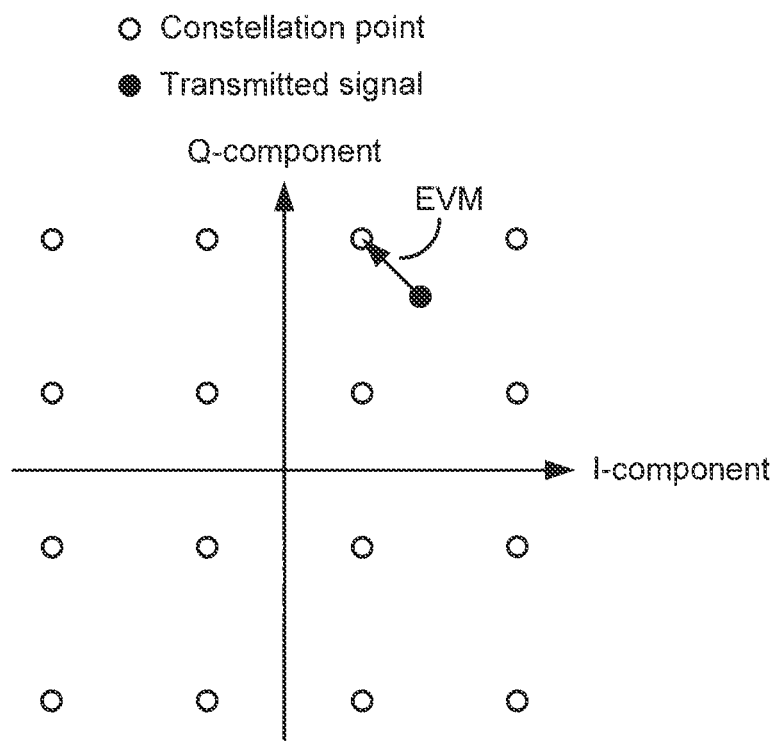
FIG. 1 shows an example of an I-Q modulation constellation showing an example of an EVM.
Figure 2:
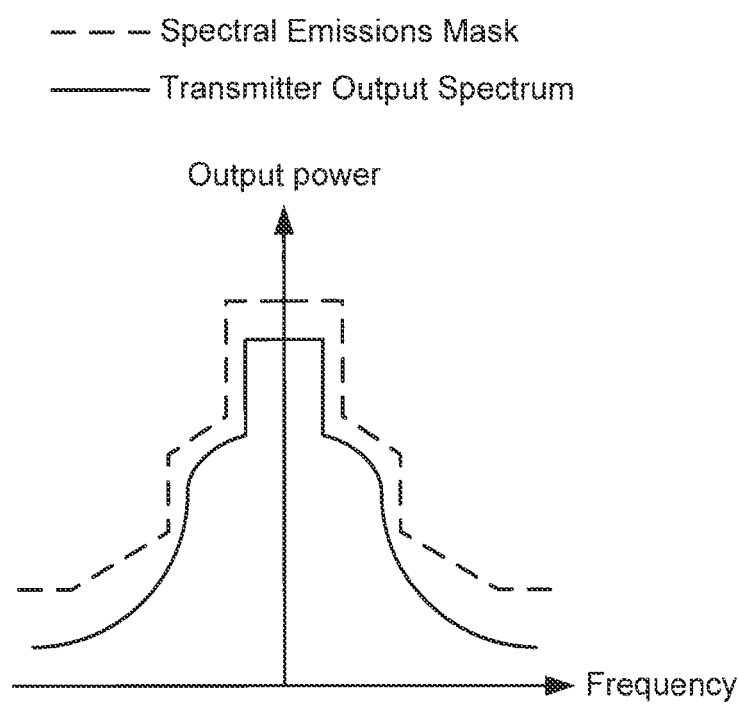
FIG. 2 shows an example of a frequency spectrum of an OFDM signal, and a target spectral mask.
Figure 3:
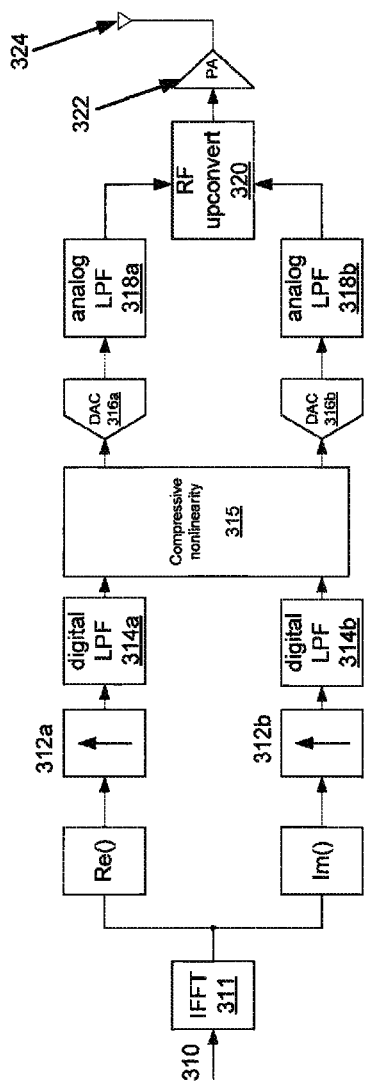
FIG. 3 shows an example of an OFDM transmitter that includes time-domain nonlinear amplitude compression.

FIG. 3 shows an example of an OFDM transmitter that includes time-domain nonlinear amplitude compression. The OFDM transmitter can be implemented, for example, in a subscriber station (SS). Symbol data (310) is applied to the input of circuit which implements an inverse Fast-Fourier transform (IFFT) (311). The real and imaginary components of the IFFT outputs are upsampled by upsamplers 312a and 312b, which interdigitate zeros between the samples of the IFFT output. The outputs of upsamplers 312a and 312b are applied to digital filters 314a and 314b, which filter the real and imaginary component of the baseband signal. For this embodiment, the outputs of the digital filters are coupled to a memoryless compressive nonlinearity function 315. The compressive nonlinearity is a nonlinear circuit element which is approximately linear for small signal inputs and has reduced gain for larger signal inputs. Let $x=x_r+jx_i \epsilon C^2$ denote the input to the compressive nonlinearity, where $x_r$ and $x_i$ denote the real and imaginary components of x, respectively. Define $$x = \begin{bmatrix} x_r \\ x_i \end{bmatrix} \in \Re^2$$

denote the direct sum representations of the real and imaginary components of x. Let $f(\bullet): \Re^2 \to \Re^2$ denote the compressive nonlinearity. Then, $\|f(\alpha x)\| \leq \alpha \|f(x)\|$ for $\alpha \geq 1$, $\alpha \epsilon \Re^+$, for the appropriate choice of norm.

The compressive nonlinearity is used to limit the peak to average power ratio of the OFDM signal at the power amplifier. When a power amplifier is driven to a point where it distorts, the distortion products may cause the spectral mask to be violated. As OFDM is the sum of a number of sinusoids, it exhibits a large peak to average power ratio (PAPR). It is the peaks of the OFDM signal which generally limit the mask compliance of a PA when driven by an OFDM signal. Hence, by limiting the PAPR using a compressive nonlinearity, the output power of the PA may be increased without violating the spectral mask. This allows the PA to produce more power than its rated power.

The outputs of the memoryless compressive nonlinearity function are applied to digital-to-analog converters (DAC) 316a and 316b, the outputs of which is filtered by analog filter 318a and 318b, respectively. These analog filters attenuate the replicas of the spectrum which appear at harmonics of the DAC sample frequency. The outputs of analog filter 318a and 318b, which correspond to the in-phase and quadrature components of the transmit signal, are applied to an RF upconverter 320. RF upconverter 320 translates the frequency of the baseband signal to the desired transmit frequency. The output of the RF upconverter is amplified by power amplifier (PA) 322 and applied to antenna 324.

Figure 4:
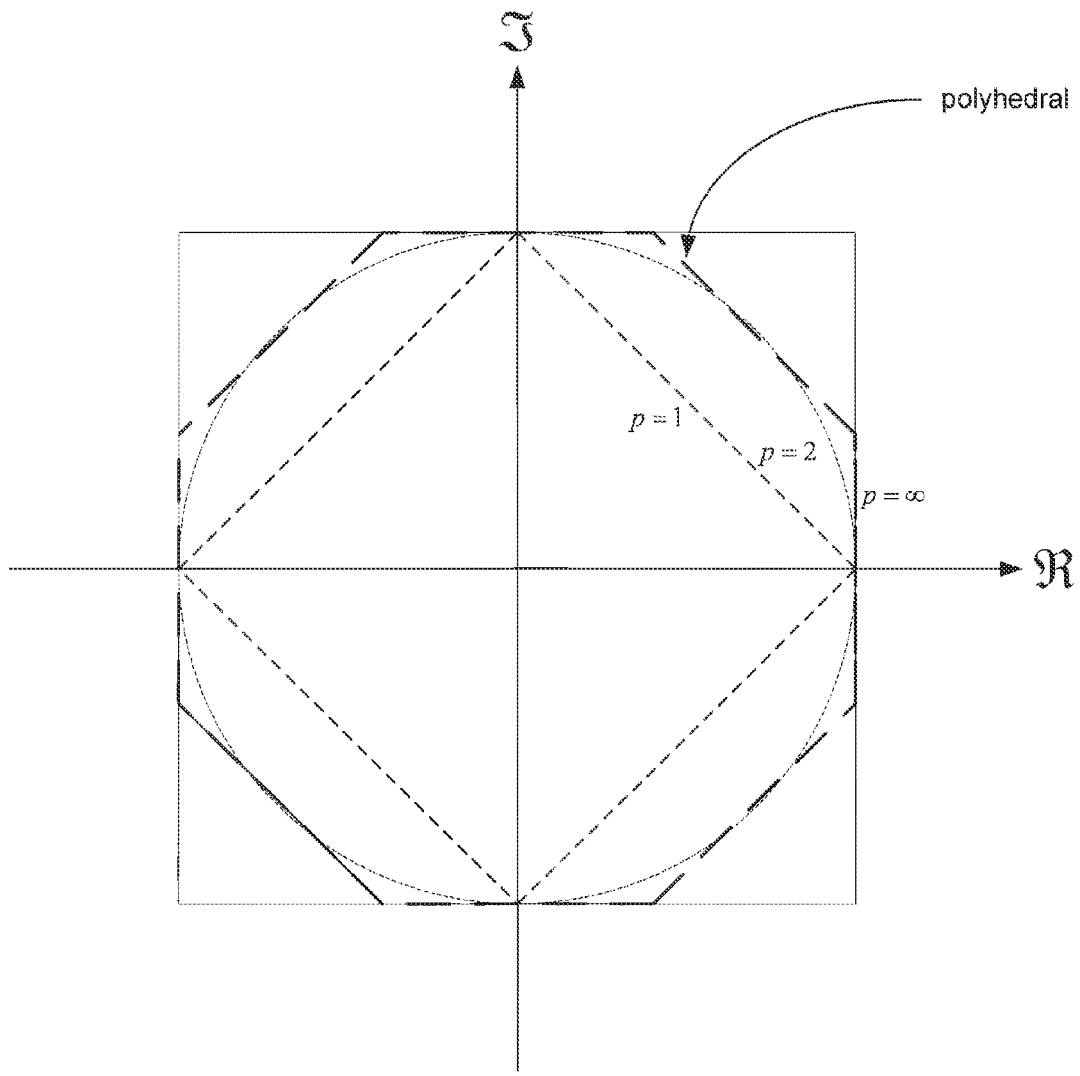
FIG. 4 shows an example of representative compressive nonlinearities consisting of p-norms and a polyhedral norm.

FIG. 4 shows an example of representative compressive nonlinearities consisting of p-norms and a polyhedral noun of a vector comprising two components. These components correspond to the teal and imaginary components of the transmitted signal. The transfer characteristics of include 4 compressive nonlinearities known as clippers in which the various norms of the input signal are limited to unity. Three of these characteristics correspond to c norm limits on the input signal. The $l_p$ of a two element vector is defined as $$\|x\|_p = (|x_r|^p + |x_i|^p)^{1/p}.$$

It has been determined experimentally the clipping the $l_2$ norm, or modulus, of the OFDM signal works well in practice as a compressive nonlinearity. In this case, the signal may profitably be clipped at a value of 10 dB above the RMS value of the OFDM signal. For transmissions with fewer constellation points, e.g., QPSK, the clipping may be applied at value that is lower than 10 dB; this allows transmission of more power without violation of relevant spectral masks. Specifically, the level of compression may be profitably adapted given the desired output power and the MCS of the signal to be transmitted.

The octagonal shaped clipper shown in FIG. 4 corresponds to a polyhedral norm and is denoted by the bold dashed line. A polyhedral norm can be defined for our purposes as:

$$\|x\|_{poly} = \sup_{i=1}^n c_i x - d_i$$

where n is the number of functions used in defining the norm, sup refers to supremum, $c_i \in \mathfrak{R}^2$ is a row vector, $d_i \in \mathfrak{R}$, and $\mathfrak{R}$ denotes the set of real numbers. A polyhedral norm may be implemented efficiently and can be used to implement $l_1$ norm. A polyhedral noun can also be used to approximate the $l_2$ norm.

Figure 5:
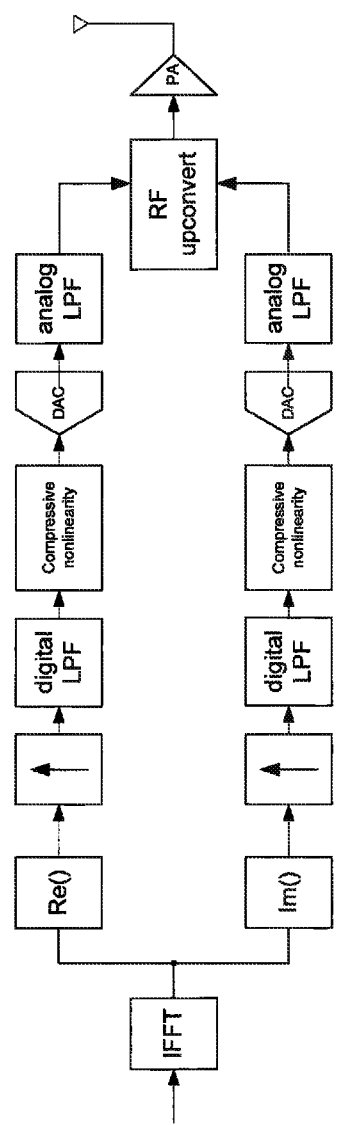
FIG. 5 shows another example of an OFDM transmitter that includes time-domain processing in which the real and imaginary components of the transmit signal are individually compressed.

FIG. 5 shows another example of an OFDM transmitter that includes time-domain processing in which the real and imaginary components of the transmit signal are individually compressed. This corresponds to limiting the infinity norm of the input signal. The approach of individually compressing the real and imaginary components of the transmit signal has the advantage of a simple implementation, although it its performance is somewhat worse than that of compressive nonlinearities that are responsive to both the real and imaginary components of the transmit signal in general and, specifically, phase preserving compressive nonlinearities.

Figure 6:
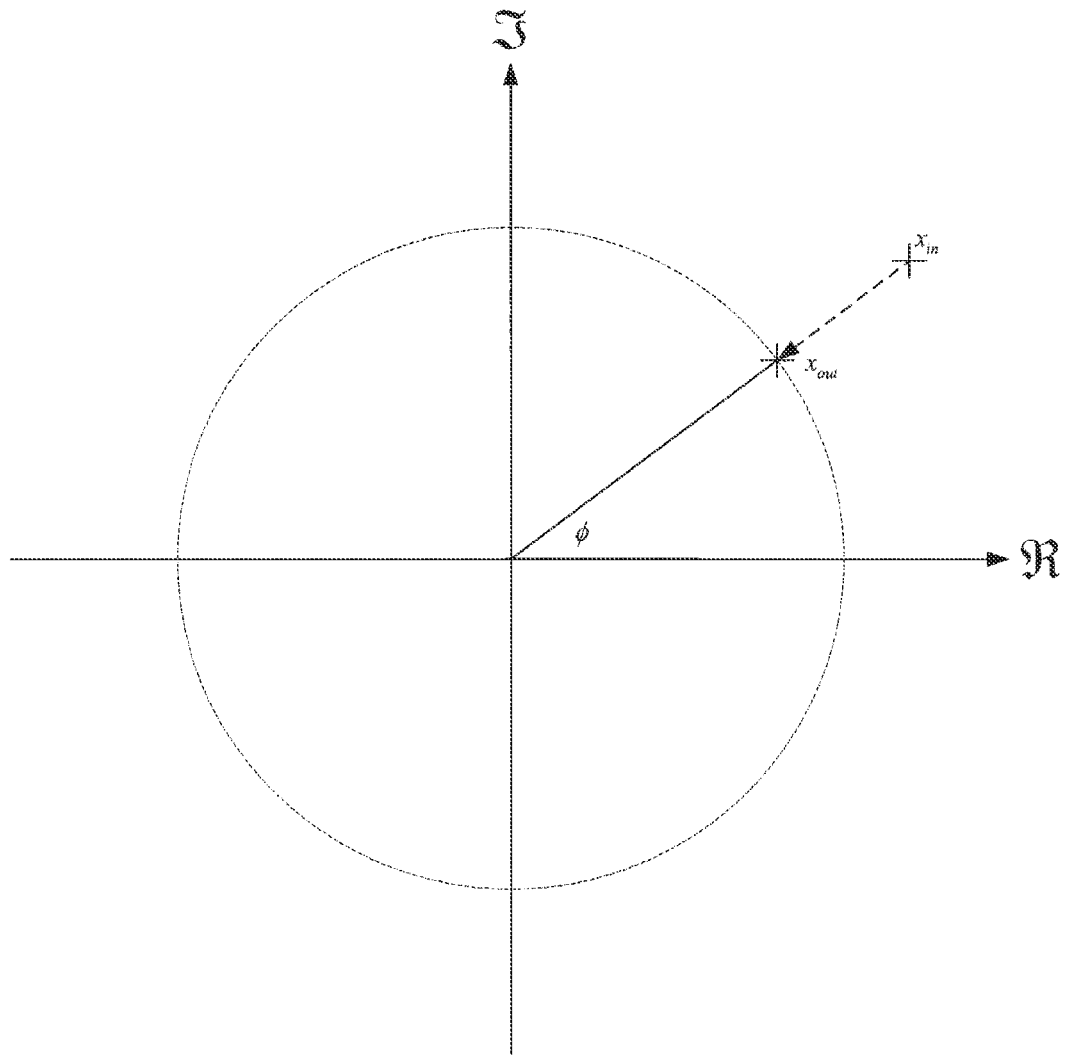
FIG. 6 shows an example of compressive nonlinearity, wherein a phase angle is preserved.

FIG. 6 shows an example of compressive nonlinearity, wherein a phase angle is preserved. Let $x_{in} = I_{in} + jQ_{in}$ denote the input to the compressive nonlinearity, where $I_{in} \in \mathfrak{R}$ and a $Q_{in} \in \mathfrak{R}$ denote the real and imaginary components of $x_{in}$, respectively. Similarly, let $x_{out} = I_{out} + jQ_{out}$ denote the output of the compressive nonlinearity, where $I_{out} \in \mathfrak{R}$ and $Q_{out} \in \mathfrak{R}$ denote the real and imaginary components of $x_{out}$. The compressive nonlinearity preserves phase if the angle of the output of the compressive nonlinearity $x_{out}$, denoted as $\phi$, equals the angle of input to the compressive nonlinearity $x_{in}$.

Figure 7:
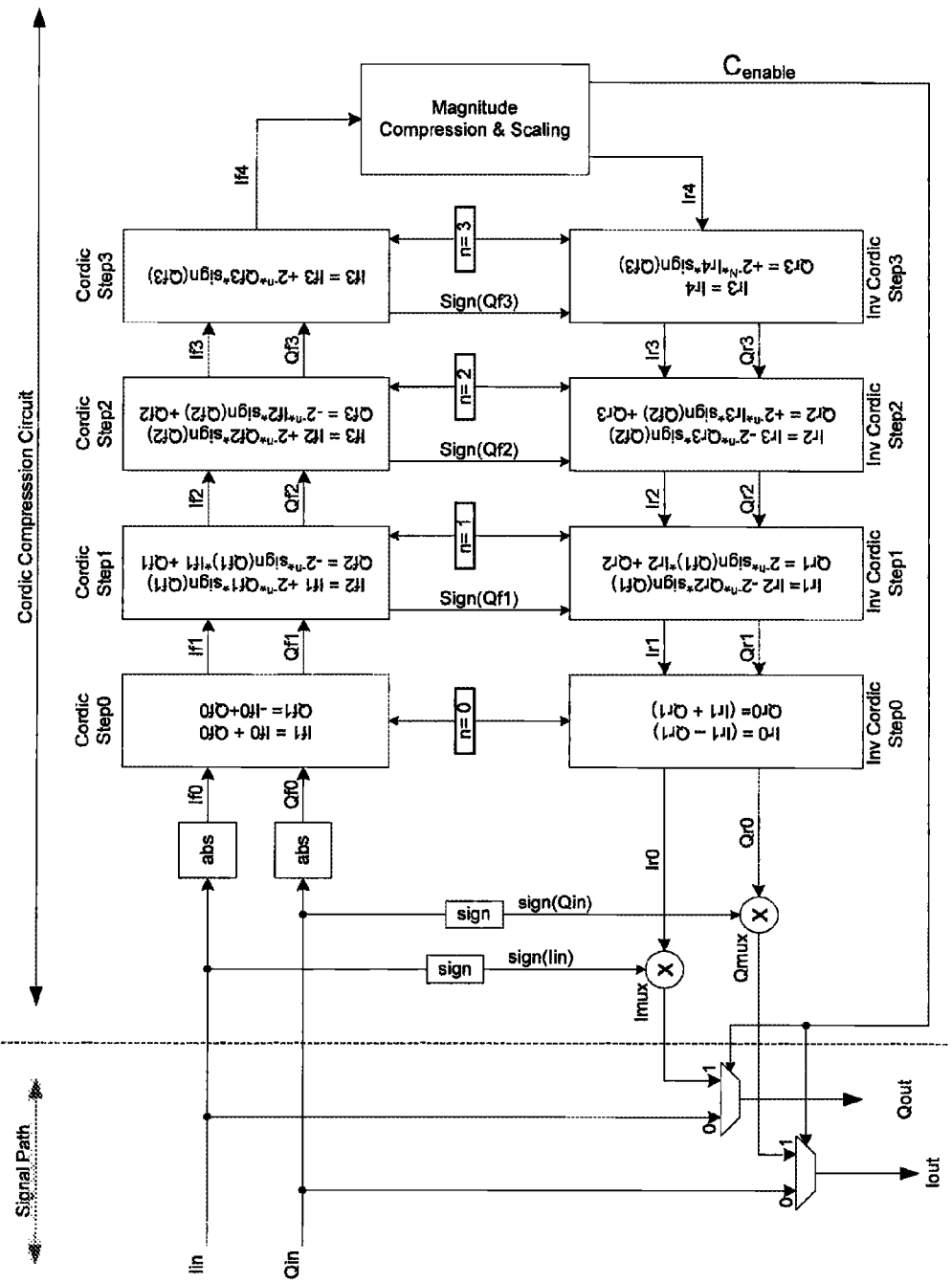
FIG. 7 shows an example of CORDIC function processing that can be used to amplitude compress the time domain transmit signal.

FIG. 7 shows an example of block diagram of CORDIC function processing that can be used to amplitude compress the time domain transmit signal in a manner that preserves the angle of the input signal. The term CORDIC (COordinate Rotation DIgital Computer) refers to a method of performing trigonometric and other functions without a hardware multiplier. CORDIC implementations of functions can be implemented efficiently in hardware. This example includes a CORDIC based compression circuit that amplitude compresses, while preserving the angle of a complex signal.

The first step of the CORDIC compression circuit is to calculate $|I_{in}|$ and $|Q_{in}|$ so that further operations can be done in the first quadrant of the complex plane. Here |•| denotes absolute value.

The CORDIC compression circuit further includes M forward CORDIC steps and M inverse CORDIC steps The forward CORDIC step is given by:

$$I_f(n+1) = I_f(n) + 2^{-n} Q_f(n) \text{sign}(Q_f(n))$$

$$Q_f(n+1) = -2^{-n} I_f(n) \text{sign}(Q_f(n)) + Q_f(n).$$

Here, n denotes the index of the CORDIC recursion, $I_f(n)$ and $Q_f(n)$ denote the input real and imaginary components of the input to the recursion; $I_f(n+1)$ and $Q_f(n+1)$ denote the outputs. FIG. 7 shows four (M=4) such CORDIC steps, with n=0, 1, 2, 3, respectively. For large values of M, the Q component output of the final CORDIC recursion is approximately zero, and hence can be neglected. The corresponding I our t represents a the magnitude of the input complex signal multiplied by a scale factor $$K = \prod_{i=1}^M \sqrt{1 + 2^{-2i}},$$

this scale factor represents the growth associated with the CORDIC operations. For large M K≈1.6468.

The output of the M th forward CORDIC step, $I_f(M)$ is compressed using a non linear function to produce an intermediate signal $I_r(M)$. One special case of interest is the clipping function, defined as, $$I_r(M) = \begin{cases} \dfrac{I_f(M)}{K^2} & I_f(M) < \bar{\rho} K \\ \dfrac{\bar{\rho}}{K} & I_f(M) \geq \bar{\rho} K \end{cases},$$

where $\bar{\rho}$ denotes the modulus of the output in the presence of large inputs. For inputs whose modulus is less $\bar{\rho}$, the output of the compressive nonlinearity equals the input. To save power, if the result of the forward CORDIC operations determines that the input signal does not require clipping, the input to the first stage of the COMIC is output as a result. This avoids the need to compute the quantity $$\frac{I_f(M)}{K^2}.$$

The reverse CORDIC operations are executed if the input signal requires clipping as indicated by the signal $C_{enable}$, where $$C_{enable} = \begin{cases} 0 & I_f(M) < \overline{p}K \\ 1 & I_c(M) \geq \overline{p}K \end{cases}.$$

Each inverse CORDIC step is defined as:

$$I_r(n) = I_r(n+1) - 2^{-n} Q_r(n+1) \text{sign}(Q_f(n))$$

$$Q_r(n) = -2^{-n} I_r(n) \text{sign}(Q_f(n)) + (Q_r(n)) + Q_r(n).$$

The final output of the CORDIC compression circuit is defined as:

$$I_{mux} = I_r(0) \text{sign}(I_{in})$$

$$Q_{mux} = Q_r(0) \text{sign}(Q_{in})$$

The $C_{enable}$ signal is used to multiplex the complex signal comprising $I_{mux}$ and $Q_{mux}$ with the signal input comprising $I_{in}$ and $Q_{in}$, according to $$I_{out} = \begin{cases} I_{in} & C_{enable} = 0 \\ I_{mux} & C_{enable} = 1 \end{cases} \text{ and } Q_{out} = \begin{cases} Q_{in} & C_{enable} = 0 \\ Q_{mux} & C_{enable} = 1 \end{cases}.$$

Figure 8:
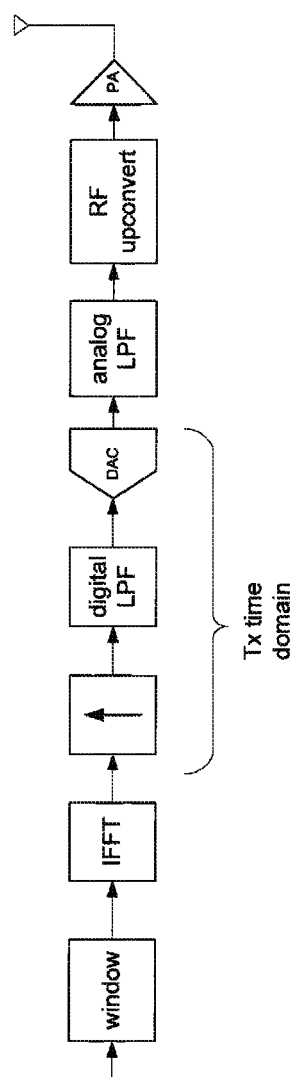
FIG. 8 is an example of a block diagram of a transmitter that includes spectral shaping in the frequency domain.

FIG. 8 is an example of a block diagram of a transmitter that includes spectral shaping in the frequency domain. This embodiment includes the spectral shaping being performed by multiplying the frequency domain representation of the transmitted signal by a windowing function 810.

Figure 9:
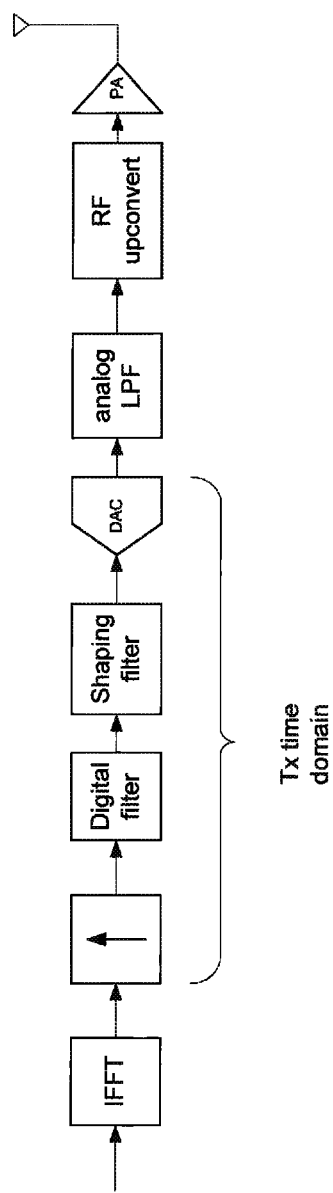
FIG. 9 is an example of a block diagram of a transmitter that includes spectral shaping in the time domain using digital signal processing techniques.

FIG. 9 is an example of a block diagram of a transmitter that includes spectral shaping in the time domain. Here, the shaping filter is implemented in the time domain. In another embodiment, the shaping filter functionality may be included in the digital filter. In yet another embodiment, the shaping filter functionality may be included in the analog filter.

Figure 10:
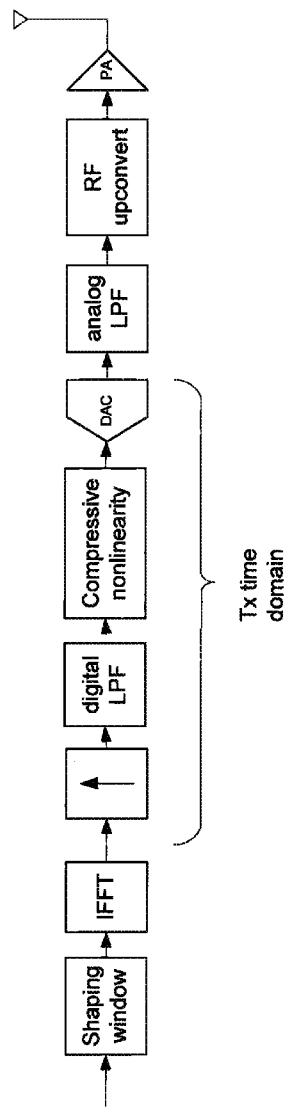
FIG. 10 is an example of a block diagram of a transmitter that includes spectral shaping and a compressive nonlinearity.

FIG. 10 is an example of a block diagram of a transmitter that includes spectral shaping and a compressive nonlinearity. For this embodiment, the use of a compressive nonlinearity is combined with spectral shaping.

Figure 11:
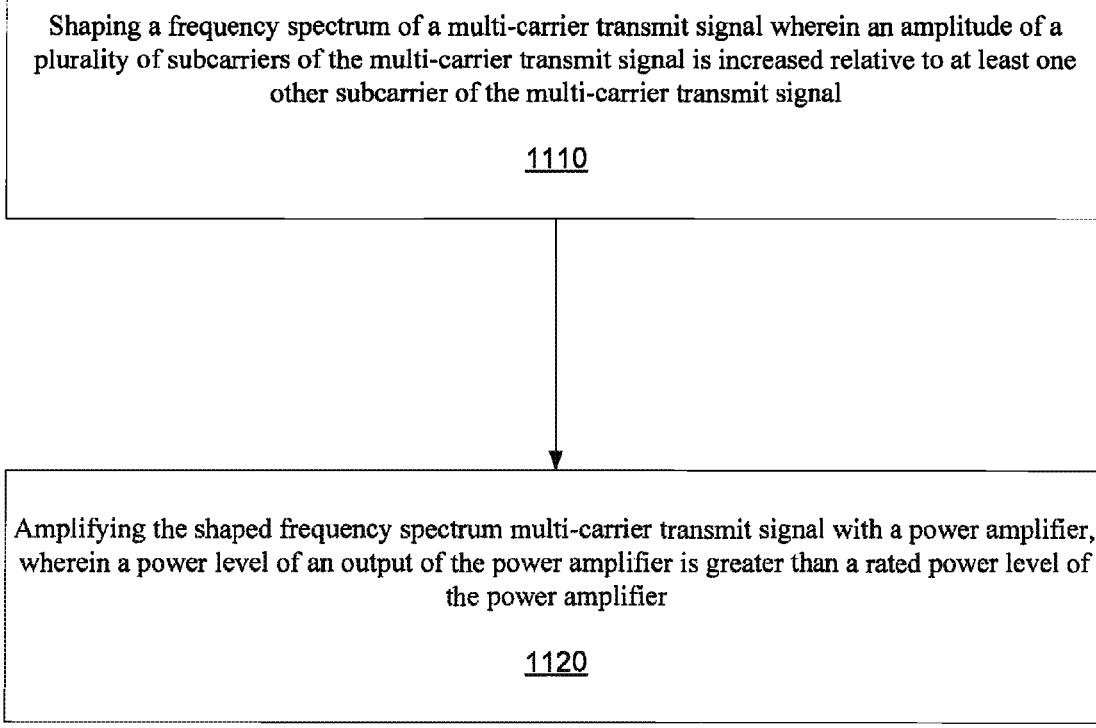
FIG. 11 is a flow chart that includes an example of a method of processing a multi-carrier signal.

FIG. 11 is a flow chart that includes an example of a method of processing a multi-carrier signal. A first step 1110 includes shaping a frequency spectrum of a multi-carrier transmit signal wherein an amplitude of a plurality of subcarriers of the multi-carrier transmit signal is increased relative to at least one other subcarrier of the multi-carrier transmit signal. A second step 1120 includes amplifying the shaped frequency spectrum multi-carrier transmit signal with a power amplifier, wherein a power level of an output of the power amplifier is greater than a rated power level of the power amplifier.

For an embodiment, shaping the frequency spectrum of the multi-carrier transmit signal includes increasing an amplitude of a first plurality of subcarriers relative to a second plurality of subcarriers, wherein the first plurality of subcarriers occupy frequencies that are closer to a center frequency of the multicarrier signal than the second plurality of subcarriers. That is, the frequency offset between the between the first plurality of subcarriers and the center frequency of the multicarrier signal is smaller (less) that a frequency offset between the second plurality of subcarriers and the center frequency of the multicarrier signal. For a baseband signal, the center frequency can be zero. However, for an intermediate frequency (IF) or radio frequency (RF), the center frequency has a value.

For the described embodiments, the rated power level of the power amplifier is a maximum power of an output signal of the power amplifier that meets EVM and spectral mask limits for a standard compliant multicarrier transmit signal, wherein the standard compliant multicarrier transmit signal has not been subject to frequency spectrum shaping. A standard compliant multicarrier transmit signal can be defined by a wireless standard such as WiMAX (Worldwide Interoperability for Microwave Access) or LTE (Long Term Evolution).

For an embodiment, shaping the frequency spectrum of a multi-carrier transmit signal results in the amplified multicarrier signal complying with a spectral mask. For another embodiment, the amplified multicarrier signal does not exceed predetermined spectral mask limits. For another embodiment, the amplified multicarrier signal does not exceed a predetermined EVM limit.

An embodiment further includes amplitude compressing a time-domain version of the multi-carrier transmit signal, and filtering the compressed shaped frequency spectrum multi-carrier transmit signal prior to amplifying the shaped frequency spectrum multi-carrier transmit signal with a power amplifier. For a more specific embodiment, amplitude compressing the time-domain version of the multi-carrier transmit signal is responsive to in-phase (I) and quadrature-phase (Q) components of the time-domain version of the multi-carrier transmit. For an even more specific embodiment, amplitude compressing the time-domain version of the multi-carrier transmit signal comprises processing I and Q components of the time-domain version of the multi-carrier transmit signal utilizing a plurality of CORDIC operations.

Figure 12:
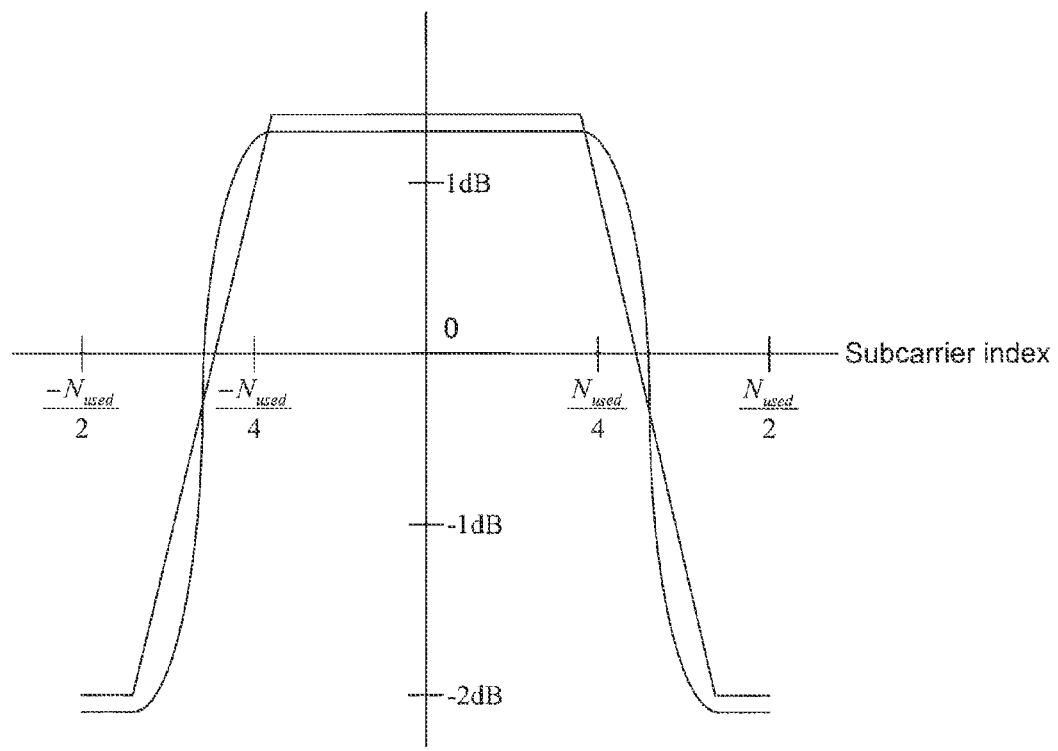
FIG. 12 shows an example of representative spectral shaping functions.

FIG. 12 shows an example of representative spectral shaping functions. A first shaping function corresponds to a constant value over the range of subcarriers from $$\left[ -\frac{N_{used}}{4}, \frac{N_{used}}{4} \right]$$

with raised cosine responses in the intervals $$\left[ -\frac{N_{used}}{2}, -\frac{N_{used}}{4} \right) \text{ and } \left( \frac{N_{used}}{4}, \frac{N_{used}}{2} \right].$$

In a second spectral shaping function, a trapezoidal shaping function is used. It similarly has a constant value over the range of subcarriers from $$\left[ -\frac{N_{used}}{4}, \frac{N_{used}}{4} \right].$$

It decays at a rate of 0.05 dB per subcarrier to a minimum value. It is desirable to limit the change in amplitude per subcarrier for two reasons. First, abrupt changes in amplitude increase the apparent delay spread of the receive signal. Second, some OFDM systems, such as WiMAX have Radio Conformance Tests with regulate the difference in transmitted power between adjacent subcarriers. WiMAX is defined in the IEEE standard P802.16Rev2/D1 (October 2007) and subsequent revisions of the standard.

Windowing decreases the power transmitted on carriers near the band edge. This Causes reduced performance on those subcarriers. However, the aggregate effect of boosting the center subcarriers and attenuating the ones near the hand edges is still positive.

$$\bar{C} = \frac{1}{N} \sum_{k=1}^{N} \log_2\left(1 + \frac{PW_k}{No}\right)$$

An equivalent signal to noise ratio for the collection of subcarriers can be calculated using $$SNR_{EQ} = 2^{\bar{C}} - 1$$

If the used subcarriers are approximately uniformly distributed over the interval $$\left[-\frac{N_{used}}{2}, \frac{N_{used}}{2}\right],$$

the effect of the windowing on capacity is minimal and the gains in equivalent SNR are approximately equal to the increase in transmitted power. The window function may be optimized to according to a predefined metric such as the equivalent signal to noise ratio subject to meeting the spectral mask.

Another embodiment includes a method of processing a multi-carrier signal of a mobile subscriber prior to the multi-carrier signal being amplified by a power amplifier of the mobile subscriber. A first step includes shaping a frequency spectrum of a multi-carrier transmit signal wherein an amplitude of a plurality of subcarriers of the multi-carrier transmit signal is increased relative to at least one other subcarrier of the multi-carrier transmit signal. A second step includes amplifying the shaped frequency spectrum multi-carrier transmit signal with a power amplifier, wherein a power level of an output of the power amplifier is greater than a rated power level of the power amplifier. For an embodiment, shaping the frequency spectrum of the multi-carrier transmit signal includes increasing an amplitude of a first plurality of subcarriers relative to a second plurality of subcarriers, wherein the first plurality of subcarriers occupies frequencies that are closer to a center frequency of the multicarrier signal than the second plurality of subcarriers.

Various embodiments include initiating the frequency spectrum shaping and operation of the power amplifier above its rated power level based on activities of the subscriber. That is, embodiments include selectively utilizing the frequency spectrum shaping and operation of the power amplifier above its rated power level. An embodiment includes the frequency spectrum shaping and operation of the power amplifier above its rated power level being utilized during a wireless network entry procedure of the subscriber. Another embodiment includes the frequency spectrum shaping and operation of the power amplifier above its rated power level being utilized when the subscriber is handing off from a first wireless base station to a second wireless base station. Another embodiment includes the frequency spectrum shaping and operation of the power amplifier above its rated power level being utilized for a subset of the MCS levels available for transmission by the subscriber. Another embodiment includes the frequency spectrum shaping and operation of the power amplifier above its rated power level being utilized for a subset of the transmission modes defined by a standard. For example, the frequency shaping and operation of the power amplifier above its rated power level may be used when in a WiMAX Band Adaptive Modulation and Coding (BAMC) mode but not when in a Partial Usage of Subchannels (PUSC) mode.

As described, an embodiment includes the subscriber station (SS) selecting to use the shaping of the frequency spectrum and transmitting a multicarrier signal at a power level that exceeds the rated power of the power amplifier during the network entry process. The network entry process is one in which the SS informs the BS of its capabilities and registers on the network. In some wireless systems, HARQ (Hybrid Automatic Repeat Request) is not supported during all stages of network entry; hence, the additional power output can be used to improve uplink coverage.

Another embodiment includes selective use of shaping of the frequency spectrum and transmitting a multicarrier signal at a power level that exceeds the rated power of the power amplifier during at least one HARQ retransmissions. The link performance of the subscriber may be improved by increasing the SS transmitter power spectral density during HARQ retransmissions. If a sufficient number of HARQ retransmissions do not result in effort free decoding of the SS transmission, the latency of SS data may increase disproportionately.

Another embodiment uses shaping of the frequency spectrum and transmitting a multicarrier signal at a power level that exceeds the rated power of the power amplifier for a subset of modulation schemes. An example of this embodiment would be the use of shaping of the frequency spectrum and transmitting a multicarrier signal at a power level that exceeds the rated power of the power amplifier only when transmitting QPSK.

Another embodiment uses compressing the time domain version of the multicarrier transmit signal and transmitting a multicarrier signal at a power level that exceeds the rated power of the power amplifier during network entry.

Another embodiment uses compressing the time domain version of the multicarrier transmit signal and transmitting a multicarrier signal at a power level that exceeds the rated power of the power amplifier during HARQ retransmissions.

Another embodiment uses compressing the time domain version of the multicarrier transmit signal and transmitting a multicarrier signal at a power level that exceeds the rated power of the power amplifier for a subset of modulation schemes.

Another embodiments uses frequency shaping and compressing the time domain version of the multicarrier transmit signal when transmitting a multicarrier signal at a power level that exceeds the rated power of the power amplifier for a subset of modulation schemes.

Another embodiments uses frequency shaping and compressing the time domain version of the multicarrier transmit signal when transmitting a multicarrier signal at a power level that exceeds the rated power of the power amplifier during network entry.

Another embodiments uses frequency shaping and compressing the time domain version of the multicarrier transmit signal when transmitting a multicarrier signal at a power level that exceeds the rated power of the power amplifier during HARQ retransmissions.

Figure 13:
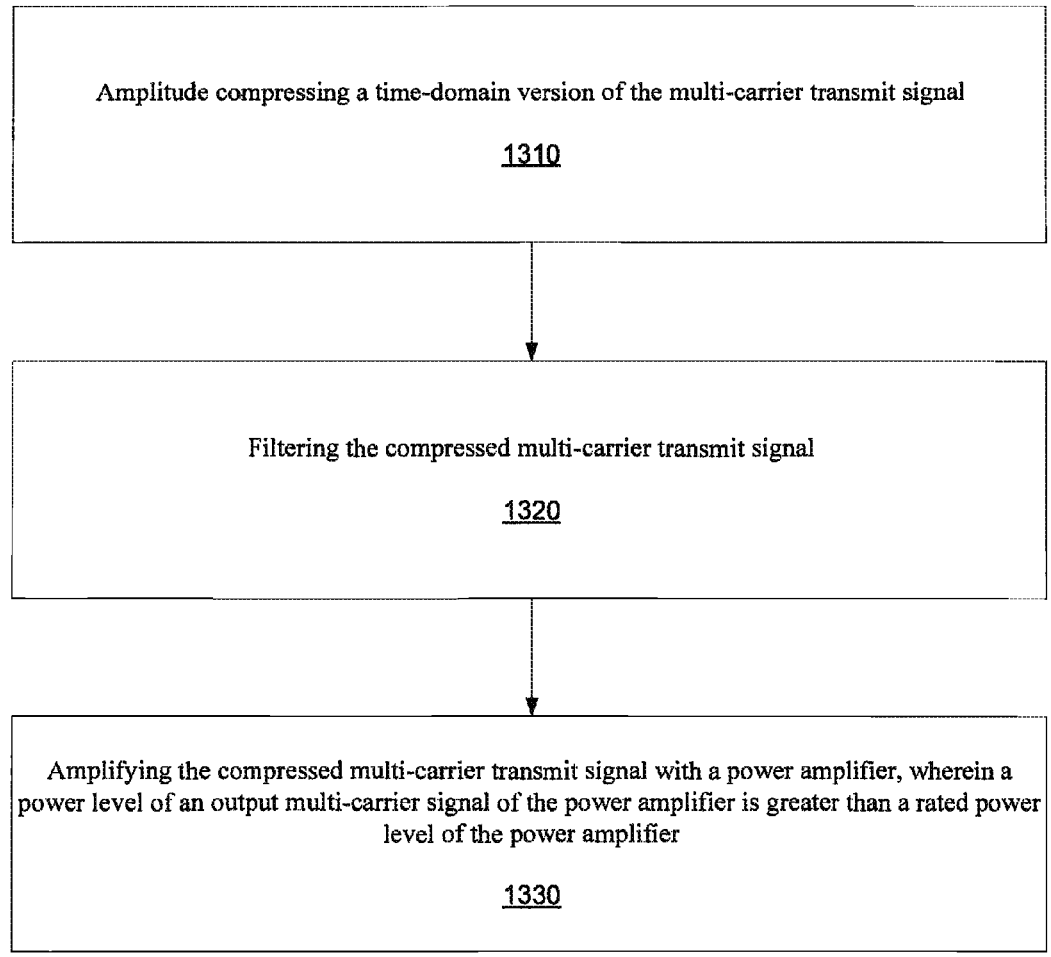
FIG. 13 is a flow chart that includes steps of another example of a method of processing a multi-carrier signal.

FIG. 13 is a flow chart that includes steps of another example of a method of processing a multi-carrier signal. A first step 1310 includes amplitude compressing a time-domain version of the multi-carrier transmit signal. A second step 1320 includes filtering the compressed multi-carrier transmit signal. A third step 1330 includes amplifying the compressed multi-carrier transmit signal with a power amplifier, wherein a power level of an output multi-carrier signal of the power amplifier is greater than a rated power level of the power amplifier.

For an embodiment, amplitude compressing enables compliance with a spectral mask as measured at an output of the amplifier. For an embodiment, the compression of the time-domain version of the multi-carrier transmit signal increases with an amplitude of the multi-carrier signal. For an embodiment, amplitude compressing the time-domain version of the multi-carrier transmit signal is responsive to in-phase (I) and quadrature-phase (Q) components of the time-domain version of the multi-carrier transmit. For a specific embodiment, amplitude compressing the time-domain version of the multi-carrier transmit signal preserves (or at least substantially preserves) an angle of I and Q components of the time-domain version of the multi-carrier transmit.

For a more specific embodiment, amplitude compressing time-domain version of the multi-carrier transmit signal includes processing I and Q components of the time-domain version of the multi-carrier transmit signal utilizing a plurality of CORDIC operations. For an even more specific embodiment, compressing the time-domain version of the multi-carrier transmit signal further includes selecting between the processed I and Q components of the time-domain version of the multi-carrier transmit signal and the I and Q components of the time-domain version of the multi-carrier transmit signal. The input to the CORDIC can be selected when the input (I, Q) signal has a small modulus.

More generally, for an embodiment, amplitude compressing the time-domain version of the multi-carrier transmit signal includes applying a memory-less compressive nonlinearity function to the time-domain version of the multi-carrier transmit signal. For a more specific embodiment, the memory-less compressive nonlinearity function limits a $l_p$ of the multi-carrier transmit signal. For another more specific embodiment, the memory-less compressive nonlinearity function is a polyhedral norm. For another more specific embodiment, the memory-less compressive nonlinearity function operates on a modulus of the time-domain version of the multi-carrier transmit signal.

Although specific embodiments have been described and illustrated, the embodiments are not to be limited to the specific forms or arrangements of parts so described and illustrated.

The invention claimed is:

1. A transmitter, comprising:
   a first digital processing branch configured to process an in-phase component of a digital input signal to provide a processed in-phase signal;
   a second digital processing branch configured to process a quadrature-phase component of the digital input signal to provide a processed quadrature-phase signal;
   a compressive nonlinearity module configured to amplitude compress the processed in-phase signal and the processed quadrature-phase signal to provide an amplitude compressed in-phase signal and an amplitude compressed quadrature-phase signal, respectively;
   a first analog processing branch configured to process the amplitude compressed in-phase signal to provide a processed amplitude compressed in-phase signal;
   a second analog processing branch configured to process the amplitude compressed quadrature-phase signal to provide a processed amplitude compressed quadrature-phase signal;
   an upconverter module configured to frequency translate the processed amplitude compressed in-phase signal and the processed amplitude compressed quadrature-phase signal to provide a frequency translated baseband signal; and
   an amplifier, having a rated power level, configured to amplify the frequency translated baseband signal to a power level that is greater than the rated power level.

2. The transmitter of claim 1, wherein the first digital processing branch comprises:
   a first upsampler configured to upsample the in-phase component to provide an upsampled in-phase signal; and
   a digital low pass filter configured to filter the upsampled in-phase signal to provide the processed in-phase signal, and
   wherein the second digital processing branch comprises:
   a second upsampler configured to upsample the quadrature-phase component to provide an upsampled quadrature-phase signal; and
   a second digital low pass filter configured to filter the upsampled quadrature-phase signal to provide the processed quadrature-phase signal.

3. The transmitter of claim 1, wherein the first analog processing branch comprises:
   a first digital-to-analog converter configured to convert the amplitude compressed in-phase signal from a digital domain to an analog domain to provide an analog amplitude compressed in-phase signal; and
   a first analog low pass filter configured to filter the analog amplitude compressed in-phase signal to provide the processed amplitude compressed in-phase signal, and
   wherein the second analog processing branch comprises:
   a second digital-to-analog converter configured to convert the amplitude compressed quadrature-phase signal from the digital domain to the analog domain to provide an analog amplitude compressed quadrature-phase signal; and
   a second analog low pass filter configured to filter the analog amplitude compressed quadrature-phase signal to provide the processed amplitude compressed quadrature-phase signal.

4. The transmitter of claim 1, wherein the compressive nonlinearity module is further configured to amplitude compress the processed in-phase signal and the processed quadrature-phase signal using a first and a second compressive nonlinearity function, respectively.

5. The transmitter of claim 4, wherein compressions of the first and the second compressive nonlinearity functions increase with an amplitude of the processed in-phase signal and an amplitude of the processed quadrature-phase signal, respectively.

6. The transmitter of claim 4, wherein the first and the second compressive nonlinearity functions enable the transmitter to comply with a spectral mask as measured at an output of the amplifier.

7. The transmitter of claim 4, wherein the first and the second compressive nonlinearity functions enable the transmitter to substantially preserve a phase angle of the in-phase and the quadrature-phase components.

8. A transmitter, comprising:
   an inverse Fast-Fourier transform (IFFT) module configured to implement an IFFT on symbol data to provide a time-domain representation of the symbol data;
   a compressive nonlinearity module configured to provide an amplitude compressed time-domain representation in response to the time-domain representation; and
   an amplifier configured to provide an amplified output having a power level that is greater than a rated power level of the amplifier module in response to the amplitude compressed time-domain representation.

9. The transmitter of claim 8, wherein the compressive nonlinearity module is further configured to amplitude compress an input to the compressive nonlinearity module using a compressive nonlinearity function.

10. The transmitter of claim 9, wherein compression of the compressive nonlinearity function increases with an amplitude of the input.

11. The transmitter of claim 9, wherein the compressive nonlinearity function enables the transmitter to comply with a spectral mask as measured at an output of the amplifier.

12. The transmitter of claim 8, further comprising:
an upsampler configured to upsample the time-domain representation to provide an upsampled time-domain representation; and
a digital low pass filter configured to filter the upsampled time-domain representation to provide a filtered time-domain representation,
wherein the compressive nonlinearity module is further configured to amplitude compress the filtered time-domain representation to provide the amplitude compressed time-domain representation.

13. The transmitter of claim 8, further comprising:
a digital-to-analog converter configured to convert the amplitude compressed time-domain representation from a digital domain to an analog domain to provide an analog amplitude compressed time-domain representation;
an analog low pass filter configured to filter the analog amplitude compressed time-domain representation to provide a filtered amplitude compressed time-domain representation; and
an upconverter module configured to frequency translate the filtered amplitude compressed time-domain representation to provide a frequency translated amplitude compressed time-domain representation,
wherein the amplifier is further configured to amplify the frequency translated amplitude compressed time-domain representation to provide the amplified output.

14. A transmitter, comprising:
a compressive nonlinearity module configured to amplitude compress a time-domain representation of symbol data in a time-domain using a compressive nonlinearity function to provide an amplitude compressed time-domain representation of the symbol data; and
an amplifier configured to provide an amplified output having a power level that is greater than a rated power level of the amplifier in response to the amplitude compressed time-domain representation.

15. The transmitter of claim 14, wherein compression of the compressive nonlinearity function increases with an amplitude of the time-domain representation.

16. The transmitter of claim 14, wherein the compressive nonlinearity function enables the transmitter to comply with a spectral mask as measured at an output of the amplifier.

17. The transmitter of claim 14, wherein the symbol data is Orthogonal Frequency Division Multiplexed (OFDM) symbol data.

18. The transmitter of claim 17, further comprising:
an inverse Fast-Fourier transform (IFFT) module configured to implement an IFFT on the OFDM symbol data to provide a time-domain representation of the OFDM symbol data; and
a digital processing branch configured to process the time-domain representation to provide a processed time-domain representation;
wherein the compressive nonlinearity module is further configured to amplitude compress the processed time-domain representation.

19. The transmitter of claim 18, wherein the digital processing branch comprises:
an upsampler configured to upsample the time-domain representation to provide an upsampled time-domain representation; and
a digital low pass filter configured to filter the upsampled time-domain representation to provide the processed time-domain representation.

20. The transmitter of claim 17, further comprising:
an analog processing branch configured to process an output of the compressive nonlinearity module to provide an analog processed time-domain representation; and
an upconverter module configured to frequency translate the analog processed time-domain representation to provide a frequency translated time-domain representation,
wherein the amplifier is further configured to amplify the frequency translated time-domain representation to provide the amplified output.

21. The transmitter of claim 20, wherein the analog processing branch comprises:
a digital-to-analog converter configured to convert the output of the compressive nonlinearity module from a digital domain to an analog domain to provide an analog amplitude compressed time-domain representation; and
an analog low pass filter configured to filter the analog amplitude compressed time-domain representation to provide the analog processed time-domain representation.

* * * * *